(12) United States Patent
Navatte et al.

(10) Patent No.: US 11,167,663 B2
(45) Date of Patent: Nov. 9, 2021

(54) DOUBLE-ACTION ACTUATOR WITH SINGLE ELECTRIC MOTOR FOR A VEHICLE

(71) Applicant: FAURECIA Sièges d'Automobile, Nanterre (FR)

(72) Inventors: Nicolas Navatte, Condé sur Noireau (FR); Emil Rdzanek, Piaseczno (PL)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/730,323

(22) Filed: Dec. 30, 2019

(65) Prior Publication Data

US 2020/0207239 A1    Jul. 2, 2020

(30) Foreign Application Priority Data

Jan. 2, 2019 (FR) ...................... 19 00012

(51) Int. Cl.
| | |
|---|---|
| *B60N 2/02* | (2006.01) |
| *B60N 2/829* | (2018.01) |
| *F16H 55/22* | (2006.01) |
| *F16H 55/26* | (2006.01) |
| *H02K 7/116* | (2006.01) |
| *F16H 19/04* | (2006.01) |
| *F16H 25/20* | (2006.01) |

(52) U.S. Cl.
CPC ........... *B60N 2/0232* (2013.01); *B60N 2/829* (2018.02); *F16H 55/22* (2013.01); *F16H 55/26* (2013.01); *H02K 7/116* (2013.01); *B60N 2002/0236* (2013.01); *F16H 19/04* (2013.01); *F16H 25/20* (2013.01); *F16H 2025/2084* (2013.01)

(58) Field of Classification Search
CPC .................. B60N 2/0232; B60N 2/829; B60N 2002/0236; H02K 7/116; F16H 55/22; F16H 55/26; F16H 19/04; F16H 25/20; F16H 2025/2084
USPC ........................................ 297/410
See application file for complete search history.

(56) References Cited

U.S. PATENT DOCUMENTS 4,141,583 A * 2/1979 Kluting ................ B60N 2/0232
                                                     296/65.06
4,470,318 A * 9/1984 Cremer ................ B60N 2/2231
                                                        74/353

(Continued)

FOREIGN PATENT DOCUMENTS

CA    2118952 C    10/1994
DE    4244725 A1    4/1994
(Continued)

OTHER PUBLICATIONS

French Preliminary Search Report for FR1900012, dated Nov. 12, 2019, BET190375 US-U ‖, 20 pages.

*Primary Examiner* — Mark R Wendell
(74) *Attorney, Agent, or Firm* — Barnes & Thornburg LLP

(57) ABSTRACT

An actuator for a vehicle seat comprises an electric motor in which the rotor rotates first and second output shafts of the electric motor; a first reduction gear rotated by the first output shaft, the first reduction gear having a first gear ratio, and driving a first notched shaft having a first notch pitch; a second reduction gear rotated by the second output shaft, the second gear having a second gear ratio, and driving a second notched having with a second notch pitch.

20 Claims, 5 Drawing Sheets

(56) References Cited

U.S. PATENT DOCUMENTS

| | | | |
|---|---|---|---|
| 5,009,296 A | 4/1991 | Ohkawa | |
| 5,330,228 A | 7/1994 | Krebs | |
| 5,528,959 A | 6/1996 | Yamakami | |
| 5,988,759 A | 11/1999 | Bauer | |
| 5,998,759 A | 12/1999 | Smart | |
| 6,290,299 B1 | 9/2001 | Frisch | |
| 6,626,064 B1 | 9/2003 | Maue | |
| 7,360,471 B2 * | 4/2008 | Lavoie | B60N 2/0296 192/48.2 |
| 8,621,960 B2 * | 1/2014 | Wrong | F16H 37/065 74/665 A |
| 8,789,671 B2 * | 7/2014 | Chevalier | B60N 2/0232 192/48.7 |
| 9,550,437 B2 * | 1/2017 | Mahler | B60N 2/24 |
| 2008/0141807 A1 * | 6/2008 | Kimura | F16H 61/32 74/335 |
| 2018/0167001 A1 * | 6/2018 | Olsson | H02K 7/1166 |

FOREIGN PATENT DOCUMENTS

| | | | |
|---|---|---|---|
| DE | 19851650 A | 5/2000 | |
| EP | 0523053 B1 | 1/1993 | |

* cited by examiner

US 11,167,663 B2

DOUBLE-ACTION ACTUATOR WITH SINGLE ELECTRIC MOTOR FOR A VEHICLE

PRIORITY CLAIM

This application claims priority to French Application No. 1900012, filed Jan. 2, 2019, which is expressly incorporated by reference herein.

BACKGROUND

The present disclosure relates to an actuator, and particularly to an actuator for a vehicle seat. More particularly, the present disclosure relates to a vehicle seat comprising an actuator.

SUMMARY

According to the present disclosure, an actuator for a vehicle seat comprises an electric motor with a rotor and a stator, the rotor rotating a first output shaft of the electric motor and a second output shaft of the electric motor; a first reduction gear rotated by the first output shaft, the first reduction gear having a first gear ratio, an output gear of the first reduction gear driving a first notched shaft having a first notch pitch; a second reduction gear rotated by the second output shaft, the second gear having a second gear ratio, an output gear of the second reduction gear driving a second notched shaft having a second notch pitch.

In illustrative embodiments, the first gear ratio of the actuator is different from the second gear ratio and/or wherein the first notch pitch is different from the second notch pitch.

In illustrative embodiments, the actuator may be implemented to control the movement of two separate devices, with movement speeds and/or movement paths that are proportional.

In illustrative embodiments, the actuator has a rotor, the first output shaft of the electric motor, and the second output shaft of the electric motor are a single piece.

In illustrative embodiments, the first output shaft of the electric motor and the second output shaft of the electric motor are attached to the rotor of the electric motor, an elastic coupling member being interposed between each among the first output shaft of the electric motor and the second output shaft of the electric motor on the one hand, and the rotor of the electric motor on the other hand.

In illustrative embodiments, one among the first output shaft of the electric motor and the second output shaft of the electric motor, and the rotor of the electric motor, are a single piece, the other among the first output shaft of the electric motor and the second output shaft of the electric motor being attached to the rotor of the electric motor, an elastic coupling member preferably being interposed between the other among the first output shaft of the electric motor and the second output shaft of the electric motor.

In illustrative embodiments, the ratio between the first gear ratio and the second gear ratio is greater than or equal to 0.25 and/or less than or equal to 0.75.

In illustrative embodiments, the ratio between the first notch pitch and the second notch pitch is greater than or equal to 0.25 and/or less than or equal to 0.75.

In illustrative embodiments, the first notched shaft and/or the second notched shaft is/are a worm or a rack.

In illustrative embodiments, the first notched shaft and the second notched shaft extend in two non-parallel directions.

In illustrative embodiments, the first notched shaft and the second notched shaft extend in two parallel directions.

In illustrative embodiments, a vehicle seat comprising a seating portion, a backrest, a headrest fixed to the backrest, and an actuator as described above in any of its combinations, the actuator being operatively connected to the headrest in order to adjust the position of the headrest relative to the backrest concurrently in two distinct directions.

In illustrative embodiments, a vehicle seat comprising a seating portion, a backrest, a headrest fixed to the backrest, a strap return also fixed to the backrest, and an actuator as described above in any of its combinations, the actuator being operatively connected to the headrest on the one hand, and to the strap return on the other hand, in order to adjust concurrently the height of the headrest and of the strap return relative to the backrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the description which follows, when reference is made to absolute position qualifiers such as the terms "front", "rear", "top", "bottom", "left", "right", etc., or relative qualifiers such as the terms "above", "below", "upper", "lower", etc., or orientation qualifiers such as "horizontal", "vertical", etc., unless otherwise specified these refer to the orientation in the figures or of a seat in its normal position of use.

Figure 1:
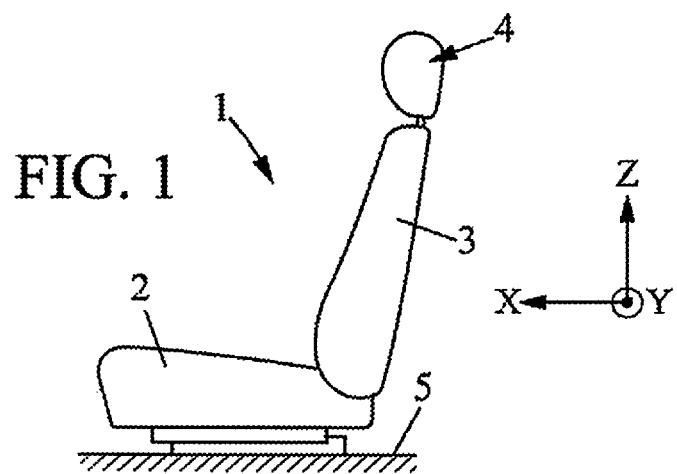
FIG. 1 is a schematic side view of an exemplary vehicle seat.

FIG. 1 schematically represents a seat 1 of a vehicle, in particular of a motor vehicle, having a seating portion 2 for receiving an occupant of the seat 1 and a backrest 3 carrying a headrest 4. The seating portion 3 is fixed to a fixed structure 5, in particular to the floor of the vehicle. The seat is fixed to the floor 5 of the motor vehicle by means of a rail mechanism or by any other means which allow adjusting the position of the seat 1 at least in the longitudinal direction X.

Figure 2:
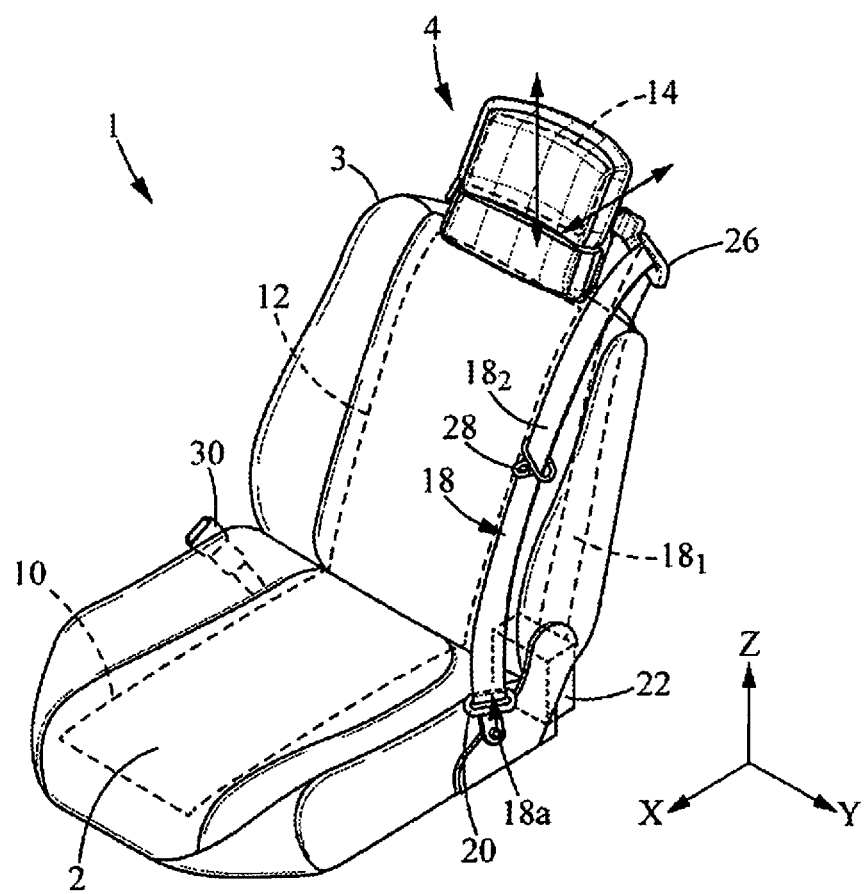
FIG. 2 is a schematic perspective view of the vehicle seat of FIG. 1.

FIG. 2 illustrates the seat 1 of FIG. 1 in more detail. It comprises a seating portion 2 with a seating portion frame 10, and a backrest 3 with a backrest frame 12. The seating portion frame 10 and the backrest frame 12 are rotatable relative to one another about an axis oriented in a substantially transverse direction, to allow adjusting the tilt of the backrest frame 12 relative to the seating portion frame 10. The mechanism for hinging the backrest frame 12 to the seating portion frame 10. Control of this hinge mechanism of the backrest frame may be either manual or motorized.

The seating portion frame 10 of the seat 1 may be mounted on devices enabling the longitudinal displacement of the seat 1 and/or the tilting of the seating portion frame 10 relative to the floor of the vehicle, in particular by using a raising device.

The seat 1 further comprises a headrest 4 with a headrest frame 14. The headrest 4 can be moved relative to the backrest frame 12 in a substantially vertical direction and in a substantially longitudinal direction of the seat 1. It is for example of interest to adjust the headrest in a vertically upwards movement—in other words away from the seating portion frame 12—concurrently with a smaller longitudinal movement of the headrest, for example towards the front of the vehicle seat 1. In effect, the backrest 3 of the seat 1 is generally oriented towards the rear of the backrest 3 of the seat, such that raising the headrest 4 results in a greater distance between the head of the occupant of the seat 1 and the headrest 4. Such a distance in undesirable, particularly in case of an impact to the front or rear of the vehicle. Such a distance can then cause indirect flexion-extension trauma to the cervical spine or whiplash. Therefore, the headrest 4 advances towards the front of the seat 1 when the occupant is large and orders a raising of the headrest 4 relative to the backrest frame 12.

Figure 3:
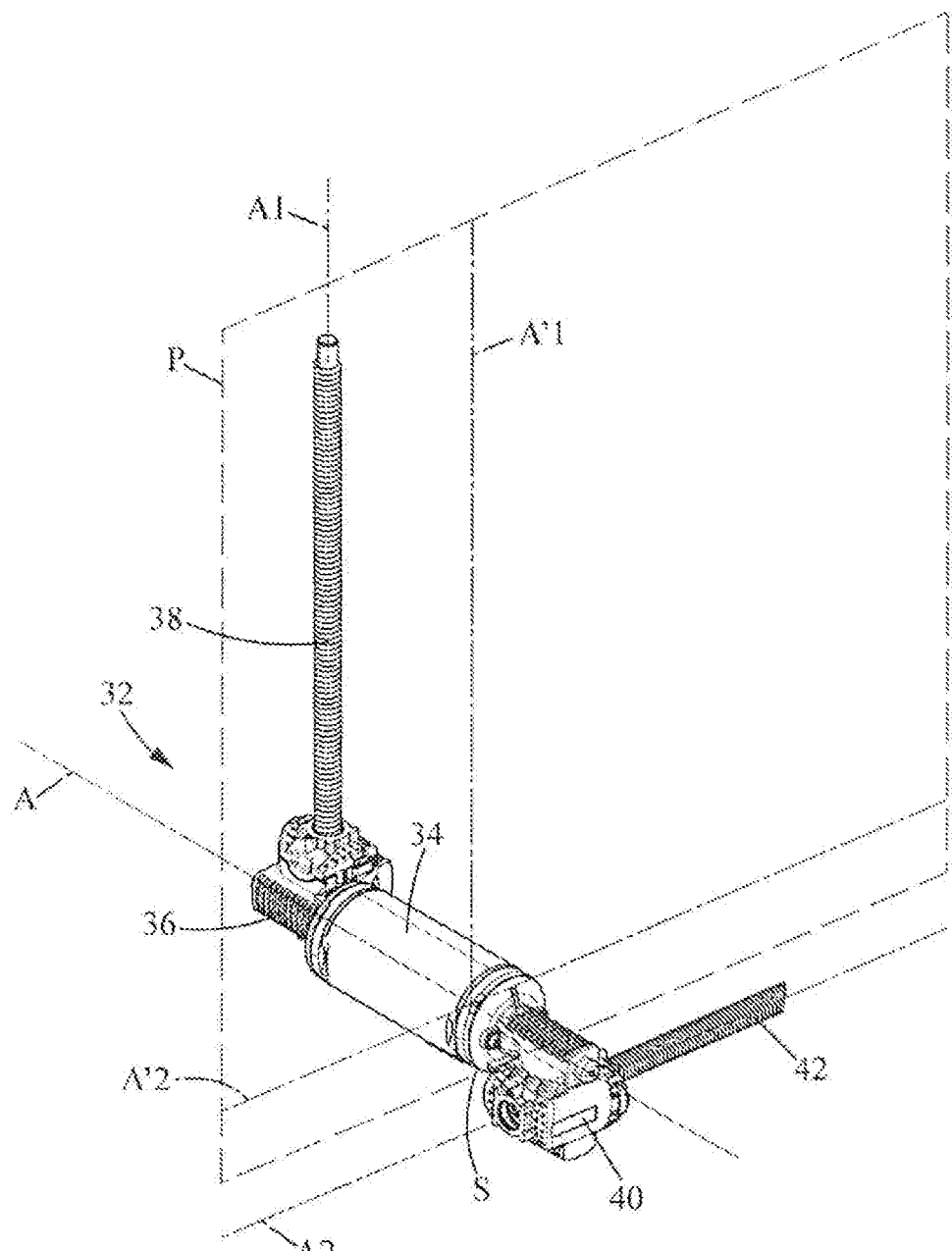
FIG. 3 illustrates a perspective view of an actuator that can be implemented in the vehicle seat of FIGS. 1 and 2.

The concurrent control of the raising of the headrest 4 and the advancement of the headrest 4 can be achieved by means of a single actuator 32, as shown in FIG. 3.

The actuator 32 firstly comprises a single electric motor 34. The electric motor 34 includes a rotor and a stator S, the stator S driving the rotation of the rotor. The motor 34 comprises a first output shaft of the electric motor and a second output shaft of the electric motor, the first and second output shafts being integral in rotation with the rotor of the electric motor 34. For example, the first and the second output shafts of the electric motor can be a single unit with the rotor of the electric motor 34. Alternatively, at least one among the first output shaft of the electric motor 34 and the second output shaft of the electric motor 34 may be attached to the rotor of the electric motor 34. In this case, an elastic coupling member may be interposed between the rotor and each among the first and second output shafts of the electric motor 34 attached to the rotor of the electric motor 34.

The first output shaft of the electric motor 34 rotates a first reduction gear 36 having a first gear ratio. The first reduction gear 36 rotates a first worm 38 having a first worm pitch. The rotation of this first worm 38 controls a substantially vertical movement of the headrest frame 14. To do this, the headrest frame 14 is for example integral with a rack which is moved translationally due to the rotation of the first worm 38, along the direction in which the first worm 38 extends. Alternatively, the headrest frame 14 is integral with a nut mounted on the first worm 38, this nut being prevented from turning when the worm 38 pivots on itself, for example by engagement with one or more stops.

The second output shaft of the electric motor 34 rotates a second reduction gear 40 having a second gear ratio. The second reduction gear 40 rotates a second worm 42 having a second worm pitch. The rotation of this second worm 42 controls a substantially longitudinal movement of the headrest frame 14. To do this, the headrest frame 14 is for example integral with a rack which is moved translationally due to the rotation of the second worm 42, along the substantially longitudinal direction in which the second worm 42 extends. Alternatively, the headrest frame 14 is integral with a second nut, mounted on the second worm 42, this nut being prevented from turning when the second worm 42 pivots on itself, for example by engagement with one or more stops.

In the case of the actuator 32 illustrated in FIG. 3, the first worm extends along a first axis A1 and the second worm 42 extends along a second axis A2, the first and second axes A1, A2 not being parallel. More precisely, non-parallel axes here is understood to mean that the projections A'1, A'2 of the first and second axes A1, A2, in a plane P normal to the axis of rotation A of the rotor of the electric motor 34 are intersecting in this plane P. In the current case, the projections A'1, A'2 of the axes A1, A2 are perpendicular in this plane P, so that these axes A1, A2 are described as perpendicular.

Since the first and second axes A1, A2 are substantially perpendicular, it is possible to control the movement of the headrest 4 in two perpendicular directions, in a coordinated manner.

The first gear ratio is different from the second gear ratio and/or the first worm pitch is different from the second worm pitch. Thus, the rotation of the electric motor 34 controls a coordinated movement of the headrest 4 upward/downward and forward/backward, but with different speeds and/or ranges of adjustment. In particular, with the rotation of the electric motor 34, a greater upward/downward than forward/backward movement of the headrest 4 is controlled. One can thus adjust the seat configuration to maximize user comfort and safety.

For example, the ratio between the first gear ratio and the second gear ratio is greater than or equal to 0.25 and/or less than or equal to 0.75.

Additionally or alternatively, the ratio between the first worm pitch and the second worm pitch is greater than or equal to 0.25 and/or less than or equal to 0.75.

Figure 4:
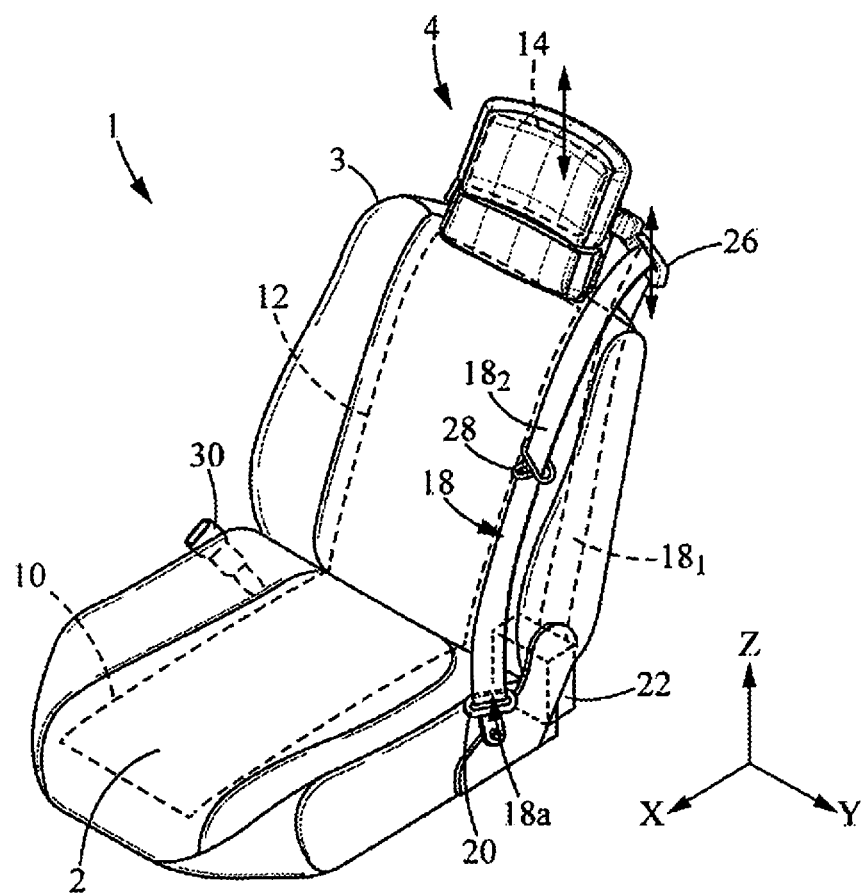
FIG. 4 is a perspective view of another exemplary vehicle seat.

Furthermore, the seat 1 shown in FIG. 4 comprises a seat belt system, similar to the one shown in FIG. 2. The seat belt system comprises a seat belt 18. The seat belt 18 is fixed at one end 18a to the seating portion frame 10 by means of a loop 20. Alternatively, the end 18a of the belt 18 may be attached to the backrest frame 12, or even to the body of the motor vehicle. However, it is of interest to attach this end 18a of the belt 18 to one among the seating portion or backrest frames 10, 12. Indeed, in such case, this end 18a of the belt follows the seat 1 when it is moved longitudinally by the occupant, in particular to adjust the driving position to his size. The loop 20 may in particular be fixed by means of a bolt or rivet.

At its other end, the belt 18 is wound inside a retractor 22. Such a retractor 22 allows pulling the belt 18 taut. The retractor 22 allows in particular winding up the belt 18 when it is not in use, so it does not hang down on the seat 1 or on the floor of the passenger compartment of the vehicle. The retractor 22 is fixed to the seating portion frame 10 or backrest frame 12 substantially to follow the movement of the seat 1 in case of adjustment by the user. The retractor 22 is located here on the opposite face of the backrest relative to the loop 20. The retractor 22 may also be integrated into the seat 1 so that it is not visible from outside the seat.

From the retractor 22 to the loop 20, when the belt 18 is not attached, the belt 18 has a first ascending strap $18_1$ and a second strap $18_2$ which are vertical. These two straps $18_1$, $18_2$ are guided by a strap return 26. Here, the strap return 26 is implemented on the right in the figure, this being a seat 1 for mounting on the left in a vehicle (in the vehicle's normal direction of travel). For a seat to be mounted on the right, the strap return 26 would be arranged symmetrically.

This strap return 26 is the element which turns the seat belt 18 around between the ascending strap $18_1$ and the descending strap $18_2$. The strap return 26 thus defines the vertically uppermost point of the seat belt 18.

The descending strap 18₂ of the belt 18 is provided with a fastening tongue 28 intended to be fixed, in particular by clicking into place, within a seat belt buckle 30. Again in order to follow the seat in case of a longitudinal adjustment to the position of the seat, the seat belt buckle 30 is fixed to the seating portion frame 10 or backrest frame 12. Alternatively, however, the seat belt buckle 30 may be attached to the body of the motor vehicle.

The height of the headrest 4 relative to the backrest frame 12 can be adjusted in a coordinated manner with the height of the strap return 26 relative to this same backrest frame 12. To do this, an actuator 32 is used, visible in FIG. 5.

Figure 5:
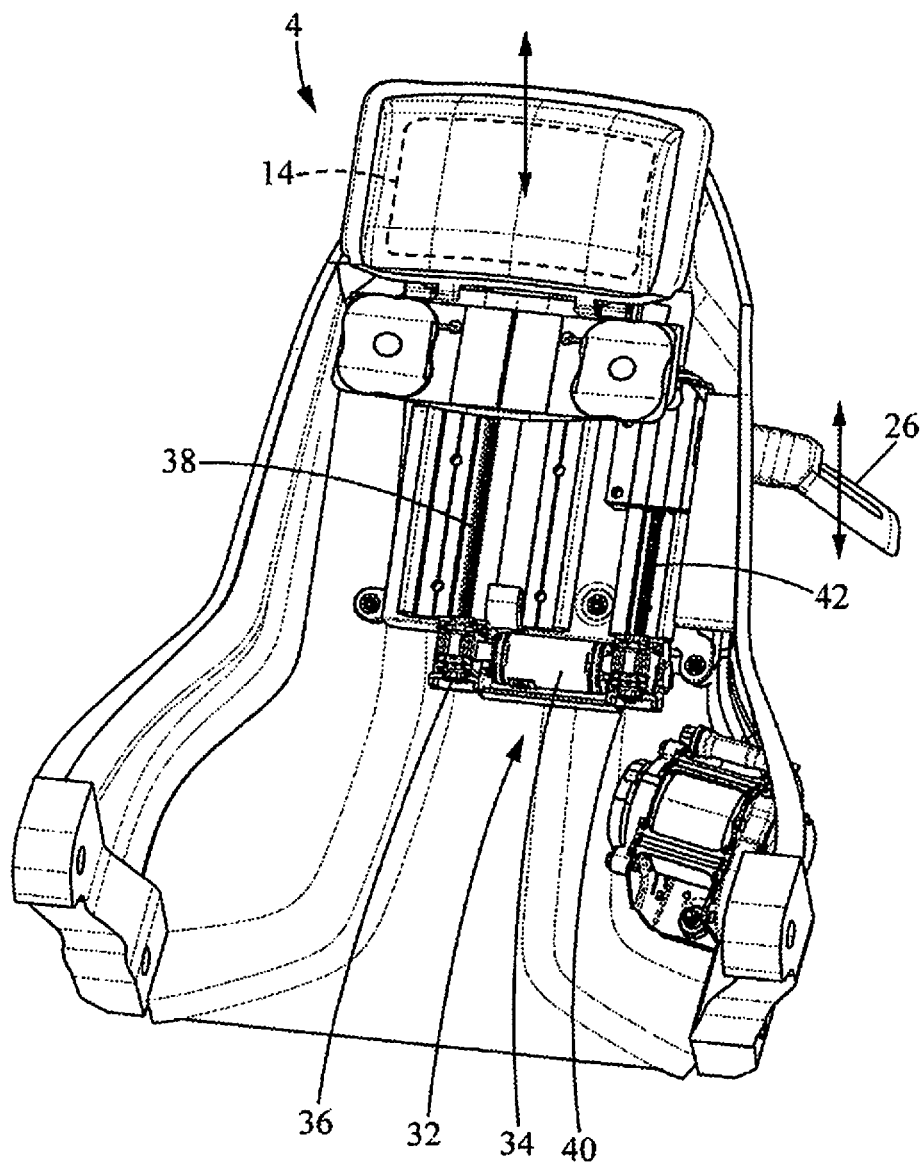
FIG. 5 is a perspective view of an actuator that can be implemented in the vehicle seat of FIG. 4.

The actuator 32 of FIG. 5 differs from the one in FIG. 3 in that the first worm 38 and the second worm 42 extend in two substantially parallel directions. In this case, the position of the headrest 4 and of the strap return 26 is adjusted in substantially parallel directions.

As discussed with reference to FIG. 3, the first gear ratio is different from the second gear ratio and/or the first worm pitch is different from the second worm pitch. Thus, the rotation of the electric motor 34 controls a coordinated movement of the headrest 4 and strap return 26, but with different speeds and/or ranges of adjustment. In particular, with the rotation of the motor, a greater displacement of the headrest 4 than of the strap return 26 is controlled. One can thus adjust the seat configuration with increased user comfort and safety.

For example, the ratio between the first gear ratio and the second gear ratio is greater than or equal to 0.25 and/or less than or equal to 0.75.

Additionally or alternatively, the ratio between the first worm pitch and the second worm pitch is greater than or equal to 0.25 and/or less than or equal to 0.75.

In the illustrated example, there is for example a range of adjustment for the height of the headrest 4, corresponding substantially to the length of the first worm 38, of about 210 mm, while the range of adjustment for the height of the strap return 26, corresponding substantially to the length of the second worm 42, is about 80 mm.

The gears rotate worms having a worm pitch. Alternatively, the gears can drive racks having a pitch between the teeth of the racks. More generally, each of the gears can drive a notched shaft having a pitch between the notches. In the case of a worm, the notches are then formed by the threading and the pitch between the notches is defined by the worm pitch. In the case of a rack, the notches correspond to the teeth of the rack and the pitch between the notches corresponds to the pitch between the teeth.

Motor vehicle seats include a headrest whose height can be adjusted to adapt to the size of the seat occupant. The position of the headrest is longitudinally adjustable, in order to bring it closer to the occupant's head and minimize or even eliminate the risk of cervical spine trauma (whiplash), particularly in the event of a front or rear impact.

However, the adjustment of the longitudinal position of the headrest may be independent of the height adjustment, so users do not take the time to make this additional adjustment.

In addition, motor vehicles include a belt with three anchorage points and a retractor. Thus, when a seat belt is deployed and worn by the seat occupant, it comprises two active straps: a chest strap and an abdominal strap which both remain pressed against the occupant because of the tension created by the retractor. The chest strap extends diagonally across the torso of the occupant, similarly to a bandolier, while the abdominal strap extends transversely, substantially at the hips of the occupant. In this position, the belt extends from the retractor to the belt buckle, which receives the belt tongue, via a strap return. The strap return guides the seat belt from a portion extending substantially vertically upwards, between the retractor and the strap return, and the chest strap that extends vertically downward and diagonally.

To maximize user comfort and safety, a user may adjust the vertical position of the seat belt strap return, according to the height adjustment of the headrest, in order to minimize the number of manipulations to be performed by the occupant.

Such a seat in which the height of the strap return, which substantially corresponds to the height of the shoulders of the seat occupant, and the height of the headrest, which is dependent on the size of the vehicle seat occupant, do not vary according to the size of the occupant at the same rate of variation.

In seats which comprise two separate actuators for adjusting the height of the headrest and of the strap return, the two actuators need to be controlled in a suitable manner to ensure the comfort and safety of the seat occupant. As a result, such seats are overly complex.

The invention claimed is:

1. An actuator for a vehicle seat, the actuator comprising an electric motor including a rotor and a stator, the rotor rotating a first output shaft of the electric motor and a second output shaft of the electric motor,
a first reduction gear rotated by the first output shaft, the first reduction gear having a first gear ratio, an output gear of the first reduction gear driving a first notched shaft having a first notch pitch,
a second reduction gear rotated by the second output shaft, the second gear having a second gear ratio, an output gear of the second reduction gear driving a second notched shaft having a second notch pitch,
wherein the first gear ratio of the actuator is different from the second gear ratio and/or wherein the first notch pitch is different from the second notch pitch.

2. The actuator of claim 1, wherein the rotor, the first output shaft of the electric motor, and the second output shaft of the electric motor are a single piece.

3. The actuator of claim 1, wherein the first output shaft of the electric motor and the second output shaft of the electric motor are attached to the rotor of the electric motor.

4. The actuator of claim 1, wherein one of the first output shaft of the electric motor and the second output shaft of the electric motor, and the rotor of the electric motor, are a single piece, the other of the first output shaft of the electric motor and the second output shaft of the electric motor being attached to the rotor of the electric motor.

5. The actuator of claim 1, wherein a ratio between the first gear ratio and the second gear ratio is comprised between 0.25 and 0.75.

6. The actuator of claim 1, wherein a ratio between the first notch pitch and the second notch pitch is comprised between 0.25 and 0.75.

7. The actuator of claim 1, wherein at least one of the first notched shaft and the second notched shaft is a worm.

8. The actuator of claim 1, wherein at least one of the first notched shaft and the second notched shaft is a rack.

9. The actuator of claim 1, wherein the first notched shaft and the second notched shaft extend in two non-parallel directions.

10. The actuator of claim 1, wherein the first notched shaft and the second notched shaft extend in two parallel directions.

11. A vehicle seat comprising a seating portion, a backrest, a headrest attached to the backrest, and an actuator according to claim 1, the actuator being operatively connected to the headrest in order to adjust the position of the headrest relative to the backrest concurrently in two distinct directions.

12. A vehicle seat comprising a seating portion, a backrest, a headrest fixed to the backrest, a strap return also fixed to the backrest, and an actuator according to claim 1, the actuator being operatively connected to the headrest on the one hand, and to the strap return on the other hand, in order to adjust concurrently the height of the headrest and of the strap return relative to the backrest.

13. The actuator of claim 1, wherein the first output shaft extends outwardly from a first end of the electric motor and the second output shaft extends outwardly from an opposite, second end of the electric motor.

14. The actuator of claim 13, wherein the first output shaft extends in a first direction and the second output shaft extends in an opposite, second direction.

15. The actuator of claim 14, wherein the first direction and the second direction are arranged along a common axis.

16. An actuator for a vehicle seat, the actuator comprising
an electric motor including a rotor and a stator, the rotor rotating a first output shaft of the electric motor and a second output shaft of the electric motor,
a first reduction gear rotated by the first output shaft, the first reduction gear having a first gear ratio, an output gear of the first reduction gear driving a first notched shaft having a first notch pitch,
a second reduction gear rotated by the second output shaft, the second gear having a second gear ratio, an output gear of the second reduction gear driving a second notched shaft having a second notch pitch,
wherein the first gear ratio of the actuator is different from the second gear ratio and/or wherein the first notch pitch is different from the second notch pitch,
wherein the first output shaft of the electric motor and the second output shaft of the electric motor are attached to the rotor of the electric motor, and
wherein an elastic coupling member is interposed between each among the first output shaft of the electric motor and the second output shaft of the electric motor and the rotor of the electric motor.

17. The actuator of claim 16, wherein the rotor, the first output shaft of the electric motor, and the second output shaft of the electric motor are a single piece.

18. The actuator of claim 16, wherein one of the first output shaft of the electric motor and the second output shaft of the electric motor, and the rotor of the electric motor, are a single piece, the other of the first output shaft of the electric motor and the second output shaft of the electric motor being attached to the rotor of the electric motor.

19. An actuator for a vehicle seat, the actuator comprising
an electric motor including a rotor and a stator, the rotor rotating a first output shaft of the electric motor and a second output shaft of the electric motor,
a first reduction gear rotated by the first output shaft, the first reduction gear having a first gear ratio, an output gear of the first reduction gear driving a first notched shaft having a first notch pitch,
a second reduction gear rotated by the second output shaft, the second gear having a second gear ratio, an output gear of the second reduction gear driving a second notched shaft having a second notch pitch,
wherein the first gear ratio of the actuator is different from the second gear ratio and/or wherein the first notch pitch is different from the second notch pitch,
wherein one of the first output shaft of the electric motor and the second output shaft of the electric motor, and the rotor of the electric motor, are a single piece, the other of the first output shaft of the electric motor and the second output shaft of the electric motor being attached to the rotor of the electric motor, and
wherein an elastic coupling member is interposed between the other among the first output shaft of the electric motor and the second output shaft of the electric motor.

20. The actuator of claim 19, wherein the first output shaft of the electric motor and the second output shaft of the electric motor are attached to the rotor of the electric motor.

* * * * *